United States Patent
Park et al.

(10) Patent No.: US 8,094,292 B2
(45) Date of Patent: Jan. 10, 2012

(54) CROSS-CHIRPED INTERFEROMETRY SYSTEM AND METHOD FOR LIGHT DETECTION AND RANGING

(75) Inventors: Yongwoo Park, Montréal (CA); Marco Peccianti, Verdun (CA); José Azana, Montréal (CA)

(73) Assignee: Institut National de la Recherche Scientifique, Quebec (CA)

( * ) Notice: Subject to any disclaimer, the term of this patent is extended or adjusted under 35 U.S.C. 154(b) by 302 days.

(21) Appl. No.: 12/561,534

(22) Filed: Sep. 17, 2009

(65) Prior Publication Data

US 2010/0118292 A1 May 13, 2010

Related U.S. Application Data

(60) Provisional application No. 61/097,647, filed on Sep. 17, 2008.

(51) Int. Cl.
*G01C 3/08* (2006.01)
(52) U.S. Cl. ........ 356/5.01; 356/4.01; 356/4.1; 356/5.1; 356/5.15
(58) Field of Classification Search .......... 356/3.01–3.1, 356/4.01–4.1, 5.01–5.15, 6–22, 28, 28.5; 342/132–136
See application file for complete search history.

(56) References Cited

U.S. PATENT DOCUMENTS

| | | | |
|---|---|---|---|
| 3,305,862 | A | 2/1967 | Samuel et al. |
| 4,344,705 | A | 8/1982 | Kompa et al. |
| 5,007,106 | A | 4/1991 | Kahn et al. |
| 5,323,258 | A | 6/1994 | Tsushima et al. |
| 7,330,270 | B2 * | 2/2008 | O'Hara et al. ................. 356/479 |
| 7,349,098 | B2 * | 3/2008 | Li .................................. 356/479 |
| 2002/0106158 | A1 | 8/2002 | Zhao |
| 2006/0061769 | A1 | 3/2006 | Yang et al. |

FOREIGN PATENT DOCUMENTS

| WO | WO 2005/076502 | 8/2005 |
|---|---|---|
| WO | WO 2005/117534 | 12/2005 |

OTHER PUBLICATIONS

B. J. Soller, D.K. Gifford, M. S. Wolfe, M. E. Frogatt, Optic Express 666, vol. 13, N. 2, 2005.

(Continued)

*Primary Examiner* — Thomas Tarcza
*Assistant Examiner* — Luke Ratcliffe
(74) *Attorney, Agent, or Firm* — Goudreau Gage Dubuc; Gwendoline Bruneau

(57) ABSTRACT

An interferometric method and system enabling light echoes-to-spectrum mapping, applicable for laser rangefinder, biomedical imaging including surface 3D mapping and tomography, vehicle position identification, and spectrum analysis. The direct mapping into spectrum allows a time-of-flight detection without using any timing pulse modulation. The sensitivity of the detection can be as high as that of the conventional low coherence interferometry, thereby an eye-safe and low-cost solution not compromising performance. In a practical implementation, high accurate range detection can be easily achievable with the level of accuracy equivalent to the laser rangefinder using a 20 ps Full-Width-at-Half-Maximum (FWHM) timing pulse. The system and method comprise applying dispersion-unbalanced interference (referred to as 'cross-chirp interference') and gating a phase matched spectral component. The dispersion unbalance used to induce linear one-to-one correspondence between the relative time delay and the spectral component, the performances in terms of range and resolution of the system and method increase with the increase in dispersion unbalance.

31 Claims, 11 Drawing Sheets

OTHER PUBLICATIONS

R. Huber, M. Wojtkowski, K. Taira, J.C. Fujimoto, Optic Express 3513, vol. 13, N. 9, 2005.

Request for proposal, "Technologies for detecting vehicle position within a certain range with high precision" Nine Sigma Inc. Request#11057-1 Sep. 2008.

M. R. Hee, "Optical coherence tomography: theory" in Handbook of optical coherence tomography, edited by B. Bouma and G. Tearney, pp. 50-66 Marcel Dekker Inc.(2002).

S. Dobson et al, "Diffractive lenses for chromatic confocal imaging," Appl. Opt. vol. 36, No. 20, pp. 4744-4748 1997.

* cited by examiner

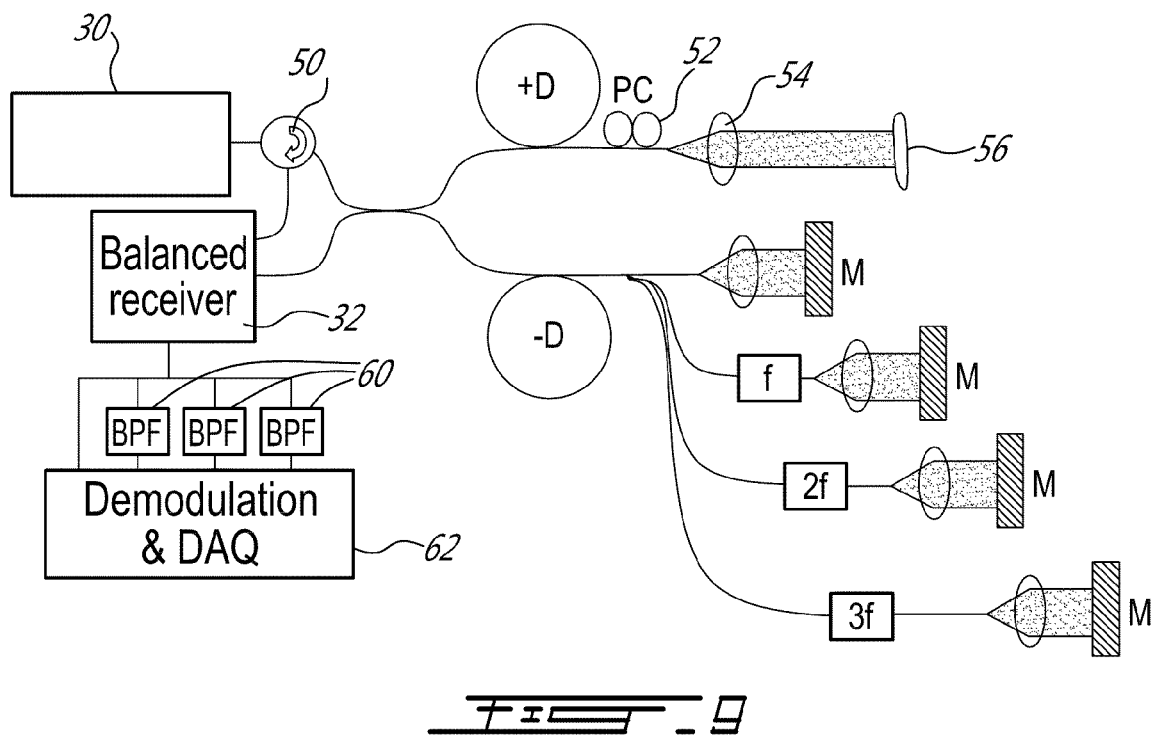
FIG. 9
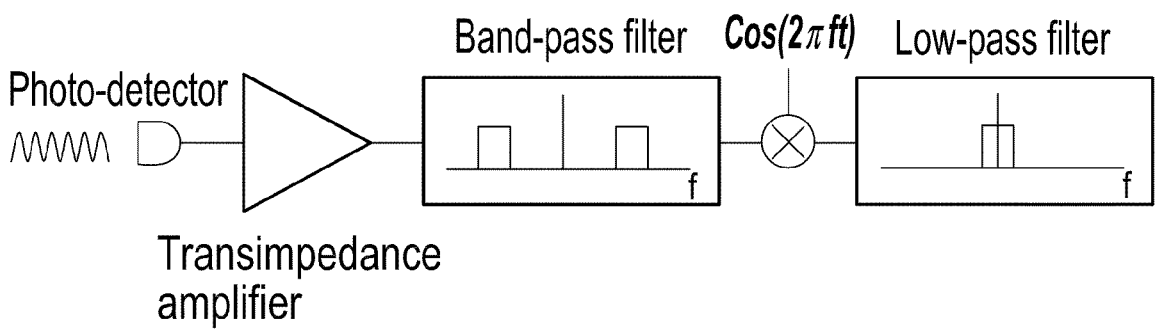
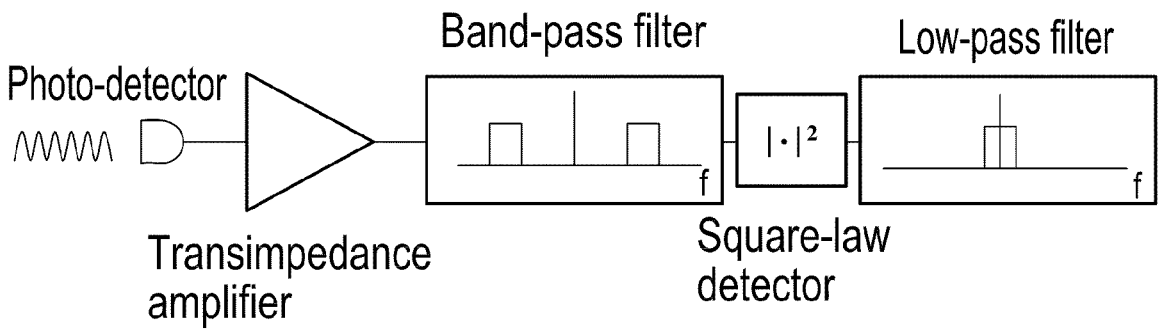
FIG. 10 (Prior Art)

PM: phase modulator
PC: polarization controller
C: circulator

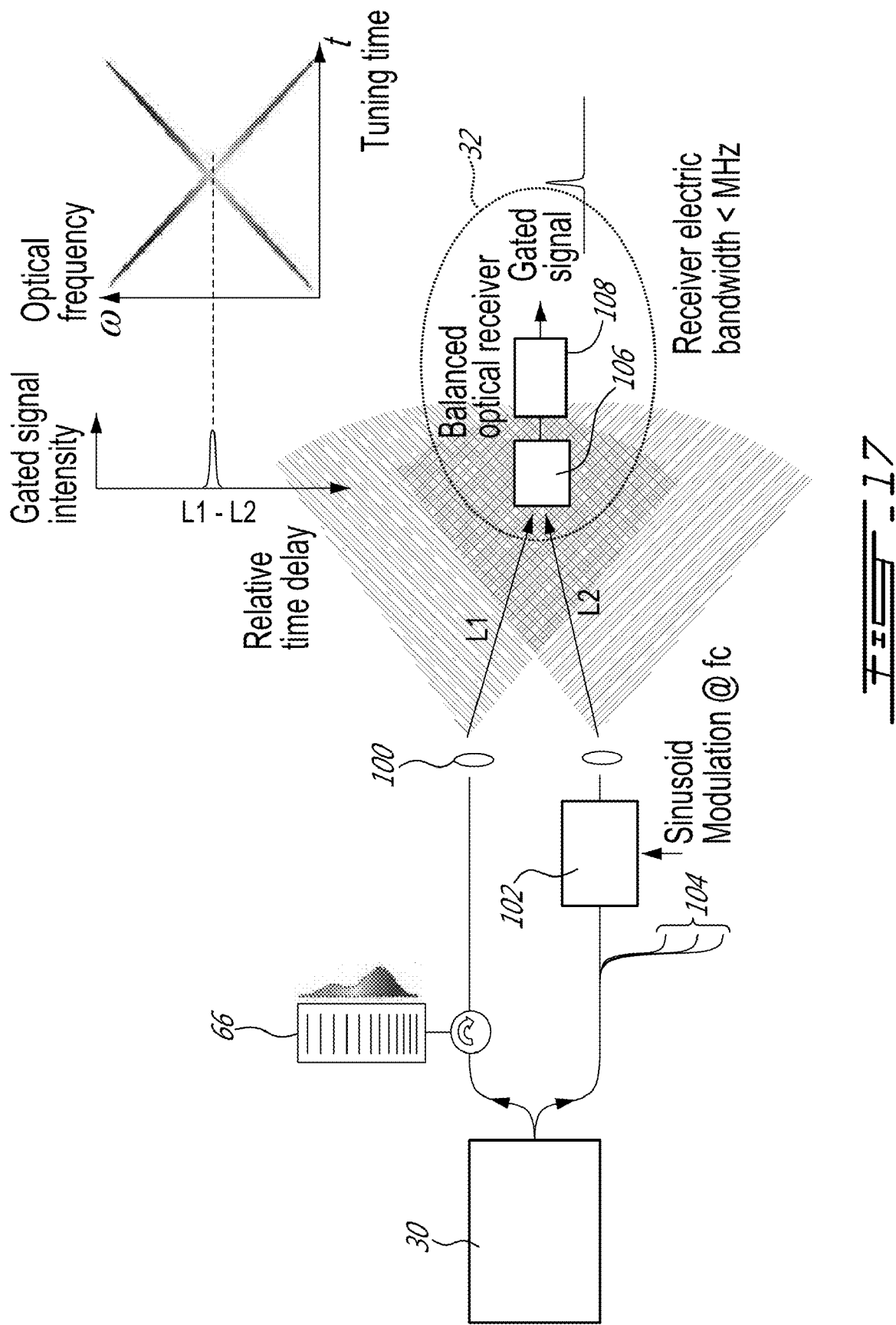

CROSS-CHIRPED INTERFEROMETRY SYSTEM AND METHOD FOR LIGHT DETECTION AND RANGING

CROSS REFERENCE TO RELATED APPLICATIONS

This application claims priority on U.S. provisional application Ser. No. 61/097,647, filed on Sep. 17, 2008. All documents above are incorporated herein in their entirety by reference.

FIELD OF THE INVENTION

The present invention relates to interferometry for light detection and ranging.

BACKGROUND OF THE INVENTION

Determining the distance to an object may be done by a laser range finder, which is an optical detection tool using a laser light to determine the distance to a reflective object.

One common technique is the time of flight (TOF) method, based on the time it takes, for a light beam reflected by the object to reach a receiver, from a transmitter sending a periodic laser pulse in a narrow beam towards the object, as shown in FIG. 1. Due to the high speed of light, this technique is not appropriate for high precision sub-millimeter measurements [1, 2]. The timing accuracy is normally determined by the pulse rising time, the bandwidth of the receiver electronics and the signal-to-noise ratio. Using a very short pulse and very high frequency electronics allows reaching a ranging accuracy of a few centimeters.

TOF detection in general is implemented in time resolving systems using high speed photodetectors (PD) and electronics as receivers to determine the time delay of the emitted optical timing pulse with respect to the reference pulse timing [1, 2]. The ranging accuracy, defined as the precision with which the position of a single reflecting target can be located along the measurement range, is directly related to the detector's bandwidth, the input pulse width, and the signal-to-noise ratio. For example, this technique requires very accurate sub-nanosecond timing circuitry, with a detector bandwidth typically exceeding GHz, to resolve the location of an object with an accuracy higher than a few millimeters, and a pulse modulation with a width less than 10 ns HWHM (half with at half maximum) is essential to provide the optical timing equivalent to the sampling resolution.

Use of a long pulse results in a lack of resolving capability as multiple reflectors may exist along the line-of-sight (LOS). For example, a 10 ns-long pulse may hardly differentiate two reflectors separated by a distance shorter than 3 meters along the LOS. Hereafter, this minimal distance is referred to as the 'resolution' of the laser rangefinder. On the other hand, use of a large bandwidth and a short pulse timing to increase the resolution and the accuracy may be hazardous to the environment since maximum permissible exposure (MPE) regulation may be exceeded as high energy pulse laser is required to increase the sensitivity and accuracy for the signal detection.

Broadband interferometric techniques such as optical low coherence reflectometry (OLCR) and optical frequency domain reflectometry (OFDR) can provide superior resolution, accuracy, and high sensitivity. Therefore, broadband interferometry, also referred to as coherence reflectometry, is usually used for photonic device/system characterization and biomedical imaging, i.e. so-called optical coherence tomography (OCT) for example [4, pages 6-8].

Schematics of set-ups for OLCR and OFDR are shown in FIG. 2 and FIG. 3, respectively.

In OLCR (FIG. 2), a low coherence signal from a broadband source 30 is divided evenly between the reference (ref) and test arms using a fiber coupler (FC). The optical delay (or light propagation time) in the reference arm can be varied by movement of the reference mirror (M). The reflected signals from each arm travel back through the coupler (FC) where they are recombined, and then received at a photodiode (PD). An interference signal will appear at the photodiode if the difference in optical length between the reference and test arms is less than a coherence length of the system. The interferometric signal is measured in the time domain, or equivalently in the delay length domain.

In contrast, OFDR (FIG. 3) is based on the measurement of the interference pattern between the light-reflection from a sample to be characterized and its coherent reference light (often called a local oscillator) in the frequency (or wavelength) domain. In OFDR, the measured spectral-domain information is converted into the desired length-domain information by use of discrete Fourier transformations (DFTs) calculated with digital signal processors (21, 22). In this method, no moving reference mirror is required.

Both interferometry techniques have critical limitations as far as the range and the repetition rate are concerned. In OLCR, as the range increases, the repetition rate decreases proportionally. In OFDR, the spectral line width to be detected is inversely proportional to the range. Only expensive high resolution and long range reflectometry using the OFDR has been found to reach performances up to 22 μm and 35 meters, respectively [3]. Such a system uses a wavelength tunable laser to acquire the spectral interference. The repetition rate is lower than 0.4 Hz. There is a well-known relation between the line width and the wavelength tuning speed, i.e. the tuning speed is proportional to the line width [4, pages 6-8]. It can be shown that the rate cannot exceed 50 Hz for a laser rangefinder with a few tens of meter range.

FIG. 4 is a schematic diagram illustrating the principle of operation of the OLCR and the OFDR showing the time (=space)-frequency (=wavelength) representation of the instantaneous CW (continuous wave) lights (or transform-limited pulses) from the two interferometer arms (the system diagrams for the OLCR and the OFDR are shown in FIG. 2 and FIG. 3 respectively). In this example, the instantaneous lights consisting of a broad spectrum of waves have been split into two interferometer arms and combined to the interferometer output port, and an example of the combined two light spectra is shown. The combined lights have a single relative time delay over the spectrum. It is important to note that both interferometer systems (i.e. OLCR and OFDR) require accurate dispersion matching between the two arms. In FIG. 4, a non-dispersed case is shown. In OLCR, the coherent overlapping between the two lights is directly detected as if a form of convolution of the two virtual pulse autocorrelations was generated for a given spectrum when the scanning delay line is moving. An example of the detected signal is schematically shown in the graph on bottom right of FIG. 4. Failure of the dispersion matching results in a broadening of the virtual pulse autocorrelations. In other words, dispersion causes the resolution degradation of the reflectometry system. The maximum range of the scanning delay line in the reference arm limits the maximal detectable range in the system. The resolution is inversely proportional to the spectral bandwidth of the light. In OFDR, the single time delay corresponds to the single frequency beating in spectrum as shown in the graph on the left of FIG. 4. The single beating is related to the single pulse in time (or space) numerically processed through the Fourier transformation. The finite spectrum resolution in detection limits the maximum detectable light range. The dispersion mismatch induces the chirping of the frequency resulting in broadening the Fourier-transformed pulse. Thus, dispersion matching is one of the key requirements for ensuring high performances in both reflectometry systems, i.e. OLCR and OFDR.

Considering the tremendous practical success of GPS technology, a wide variety of current and future applications could be also anticipated for a Local Position identification System (LPS) providing both high speed and high precision (<1 mm). For example, in a future sophisticated transportation context, vehicles may need to be maneuvered automatically with high precision and nearly in real-time in a local region or in a restricted path for efficient system operation [5]. Particularly, for monitoring the next generation of future small vehicles, high-resolution and high-accuracy LPS systems capable of detecting multiple vehicles' positions and velocities on the LOS will be necessary. Such applications would need instantaneous position and velocity (speed+direction) information of the moving target with extremely high precision. In fact, such systems may prove extremely useful not only for localized transportation, but also for a range of applications such as manufacturing industry, military, aerospace technology etc. However, the GPS technology cannot be directly applied to cover the needs of these anticipated application fields, mainly due to its low resolution (next generation GPS are expected to provide localization accuracy of around 1 m), which is associated with the use of radio frequency waves. The use of an optical wave (near infrared to Tera-Hertz) in the LPS could help overcoming this severe resolution limitation considering its center frequency (>100 THz, i.e. about 1,000 times larger than in a radio frequency wave) and associated ultra-wide bandwidth. Still, the technical path to transfer the carrier wave from the radio frequency domain to the optical frequency domain is not straightforward. For instance, light modulation on the optical carrier can be achieved only over bandwidths up to a few tens of Gigahertz (e.g. using presently available electro-optic modulation techniques), which would not be sufficient to improve the position resolution in the detection system beyond the range of a few centimeters. Moreover, for practical applications, the wireless receivers for the positioning detection need be cost-effective and able to operate independently in a very limited volume with a small form factor.

There are two major methods for high resolution and sensitive spectral measurement: the spectrum-to-space conversion using a reflective grating and Fourier transform infrared spectroscopy (FTIR). The spectrum-to-space conversion is a popular method and has been used in a wide spectral range from UV to IR wavelengths. This technique provides a high system design flexibility that can be either optimized for high resolution (<0.1 nm) or for low-cost low resolution (~1 nm). The spectral slicing in space for the spatial isolation of the spectral components results in the performance tradeoff between the detection sensitivity (or dynamic range) and the spectral resolution. The production is increased proportionally with the resolution increment because a very rigid system platform, large optical free space, and ultrahigh sensitive array detector (i.e. charge coupled device) are required. Low cost solutions can be found for low resolution systems (~1 nm) in the visible and near IR wavelength range. The limited wavelength ranges (i.e. not applicable for IR wavelength) are associated with the fact that the low cost Si-based CCD (charge-coupled device) array has a limited spectral responsivity up to near IR.

FTIR is an interferometric spectral analysis that uses the discrete Fourier transformation for reconstructing the spectrum of the source under test. It provides high sensitivity and high resolution spectral analysis in IR wavelength range. However, the required high precision of the reference delay line and the complexity of the system configuration limit its feasible applications to material and biological research in a wavelength longer than 1 micron. In addition, the production cost cannot be decreased.

Therefore, a low-cost, portable, low power-consumptive and light-weight spectral analysis instrument is still in high demand, for example in optical telecommunication applications considering the fact that advanced optical networks currently utilize a wide optical bandwidth (>80 nm) and often require diagnosis of spectral channels in the field.

SUMMARY OF THE INVENTION

More specifically, in accordance with the present invention, there is provided an interferometric system, comprising a broadband source, an interferometer between the broadband source and an object, and a detector circuit, wherein a signal from the source is divided into a signal arm and a reference arm of the interferometer, light in the signal arm being reflected back from the object, light in the reference arm being modulated in one of: i) phase and ii) amplitude, and signals from the two arms are cross-chirped by unbalanced dispersions and combined, the detector circuit detecting a time-delay of a single electric pulse in a resulting signal, the cross-chirp interference inducing a direct mapping of the time of flight into the spectrum with respect to a reference delay.

There is further provided a method for light echoes-to-spectrum mapping, comprising directing a signal reference from a broadband source to an object for reflection by the objet, modulating a reference signal from the broadband source in one of: i) phase and ii) amplitude; applying a dispersion-unbalanced interference between the two signals; and gating a resulting phase matched spectral component; wherein the interference induces a direct mapping of the source spectrum into an interference amplitude with respect to a reference delay.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 9 illustrates a schematic set-up for a XCI laser rangefinder according to a further embodiment of the present invention;

FIG. 10 illustrate envelope detection electronics as known in the art (Ref. [6]);

FIG. 17 is a schematic diagram illustrating a position identification system based on a XCI according to an embodiment of the present invention.

DESCRIPTION OF ILLUSTRATIVE EMBODIMENTS

The present invention is illustrated in further details by the following non-limiting examples.

In a nutshell, the present invention provides an interferometric method enabling high speed, high precision and high sensitivity time-of-flight (TOF) optical range finding or position identification, and a system allowing a direct TOF-to-spectrum mapping enabling spectral domain acquisition for the TOF detection.

Cross-chirp interference is used. The range determination, i.e. the time-of-flight measurement, is simply made by the time-delay detection of a single electric pulse in the acquired signal. Thus, a very simple electric circuit including an envelope detector and a counter is needed for the range determination.

The present method is a phase sensitive coherent optical gating method using a dispersion-imbalanced interference, whereby different group delay dispersion slopes are applied in two interferometer arms and interfered at a photo-detector after combining the lights from the two arms. The dispersion mismatching can be introduced using any dispersive material, device or sub-system providing a suitable amount of group-velocity dispersion around a target operation wavelength. These include different types of optical fibers, fiber Bragg grating or long-period fiber grating-based devices, and diffraction-based dispersive elements (bulk-optics phase gratings, prisms etc.).

According to a first embodiment of a system according to a first aspect of the present invention, there is provided a mid-range laser range finder based on cross-chirp interference (XCI).

Figure 5:
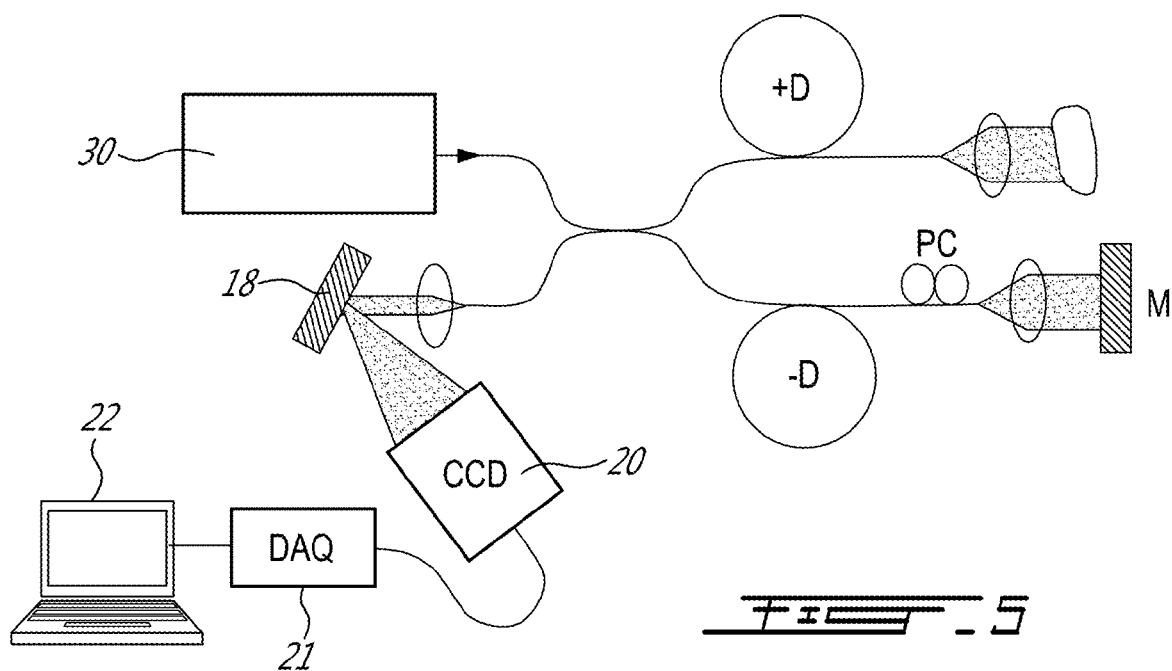
FIG. 5 is a schematic diagram of a set-up for a mid-range laser range finder based on cross-chirp interference (XCI) according to a first embodiment of an aspect of the present invention.

In the system illustrated in FIG. 5 for example, the signal from the broadband source 30 is divided between the signal arm (+D) and the reference arm (−D). The optical delay in the reference arm can be varied by movement of the reference mirror (M). The broadband source 30 can be either continuous a wave (CW) or a pulsed wave.

The lights from the two interferometer arms are dispersed with signs. In an embodiment described hereinbelow in relation to FIG. 12, the lights from the two interferometer arms are dispersed with different amounts.

The phase gating associated with the relative phase delay between the reference and the signal arms is made in spectrally resolved detection when the two interfered beams, cross-chirped by unbalanced dispersions, are received in a spectrometer such as charged-couple device (CCD) 22, and then data acquisitions electronics 21 (DAQ) and further processed by a processing unit 22.

This implies that there exists a unique single phase match, referred to as the crossing point for example, between the two signals in optical frequency.

Figure 6:
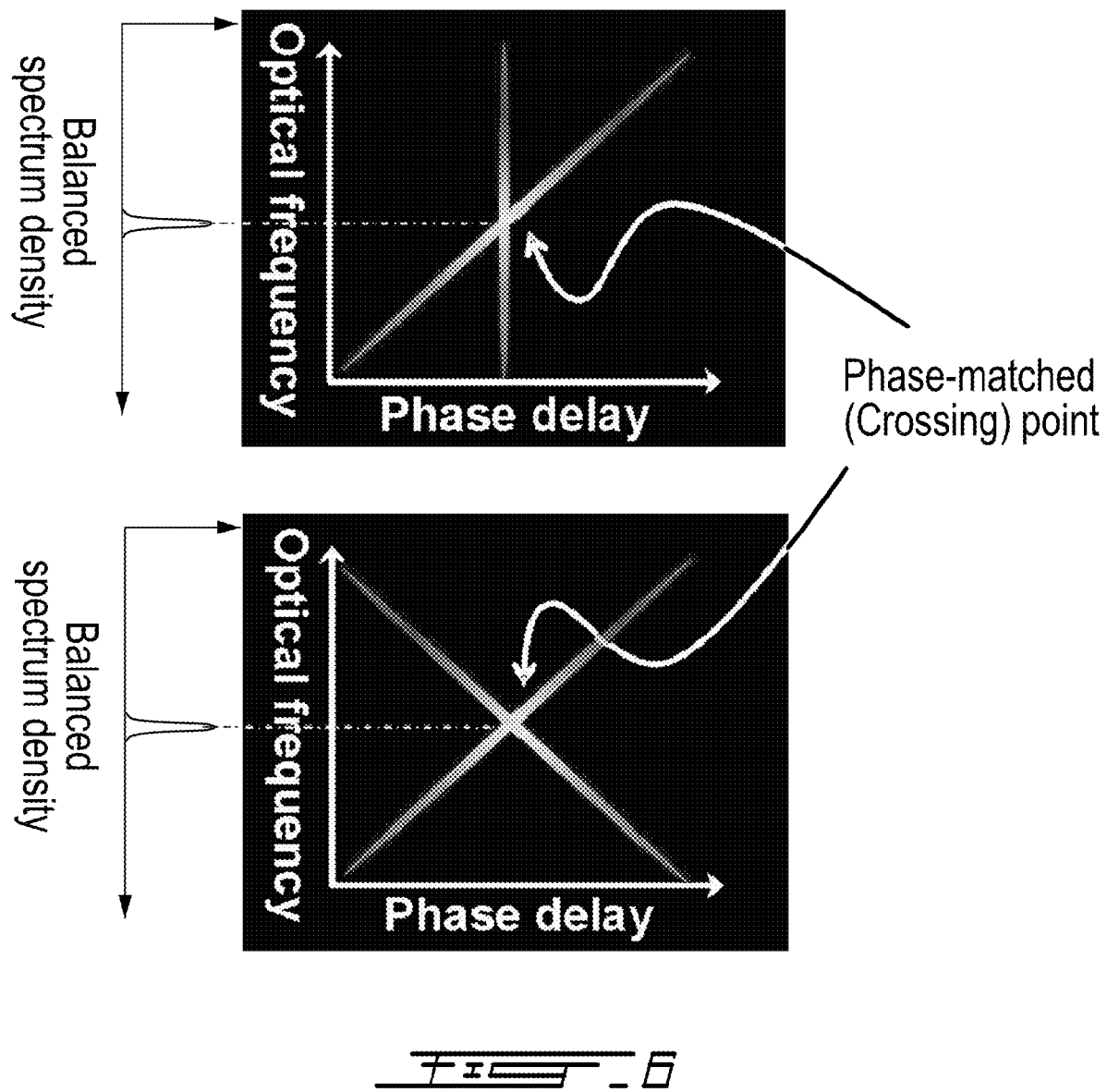
FIG. 6 shows a time-frequency representation of the combined lights at the output port of the interferometer, in cross-chirp interference (XCI)

Examples of the dispersion-unbalanced overlapping between the reference and the signal are shown in FIG. 6. A one-to-one correspondence can be found between the phase-matched spectrum and the receiver's distances from the reflectors. This phase match can be visible as a pulse shape in a finite resolution spectrum analysis.

Thus, spectral measurement with a finite bandwidth can easily allow the gating operation in order to isolate the phase matched spectral density. This gating is a completely linear-optic process, i.e. it does not involve any high power interaction in a nonlinear medium. The difference of the dispersion-bandwidth product in between the two interferometric arms determines the detectable position range, i.e. the maximum time delay allowed in this coherent detection, whereas the gated spectral width determines the resolution of the point-spread-function (PSF) corresponding to a detection point (which is the critical value for distinguishing two local reflections in proximity).

As people in the art will appreciate, contrary to conventional TOF methods, the present method does not rely on the short pulse timing of the light source but on the spectral phase gating of a broadband source in the spectral domain. Thus, it does not necessarily require a pulsed operation of the light source. The associated advantages include low cost, high resolution, defined here as the minimum distance along the laser line-of-sight between two distinguishable features, and eye safe operation. The achieved high resolution can provide the ranging capability for multiple targets separated by distances shorter than ~25 mm (according to calculations at IR wavelength). In addition, the electronic bandwidth of the receiver can be at least 1000 times smaller than in TOF methods, while providing an equivalent performance in terms of accuracy. In conventional TOF, a rising time of the pulse modulation faster than 80 ps would be normally required to be able to achieve a resolution of about 25 mm.

The present invention enables achieving sensitive range detection over >40 m from a low frequency receiver with a very high precision (less than 100 μm) and a fast repetition rate (higher than 100 Hz). The detection dynamic range, defined as the maximum to minimum detectable power ratio in dB, i.e. the reflectivity sensitivity, can match that of OLCR systems and may reach up to about −100 dB. The receiver does not require a large volume, and any high frequency electronics, in particular with electronic bandwidth less than 10 MHz, can be used. Thus, the present invention is suitable for range detection systems requiring low-cost and small-form-factor receivers such as laser rangefinders for robots or small vehicles as well as for position identification.

Besides TOF-to-spectrum mapping, the present invention allows a very simple and low-cost spectrum measurement method by only linearly delaying the reference path with a coarse precision (i.e. sub-millimeter). It does not require any post numerical process to reconstruct the spectrum contrary to the FTIR because the cross-chirp interference induces the direct mapping of the source spectrum into the interference amplitude with respect to the reference delay. The coarse precision of the reference delay reduces the cost of the system construction considerably because it does not require a fine and accurate nano-scale translation with a high precision encoder. The associated advantages also include a fast sweep of the delay. As a result, the present invention may be used in optical telecommunication applications requiring a portable low-cost DWDM (dense wavelength-division multiplexing) channel analyzer for example.

Contrary to the strict requirement of the dispersion match in OFDR and OLCR as known in the art, the present cross-chirp interferometer system induces a large amount of dispersion imbalance by applying different dispersive medium in the interferometer arms.

Figure 1:
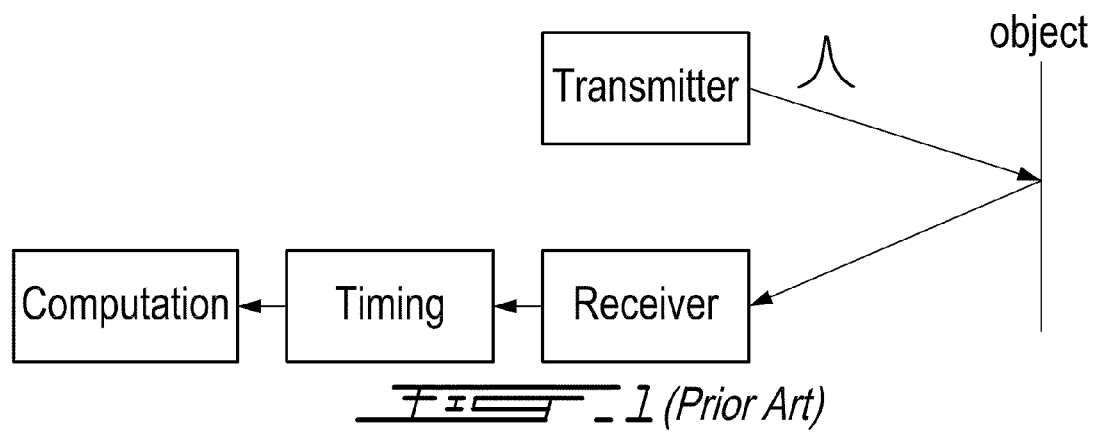
FIG. 1 is a schematic view illustrating the principle of a time-of-flight laser range finder, as known in the art.
Figure 2:
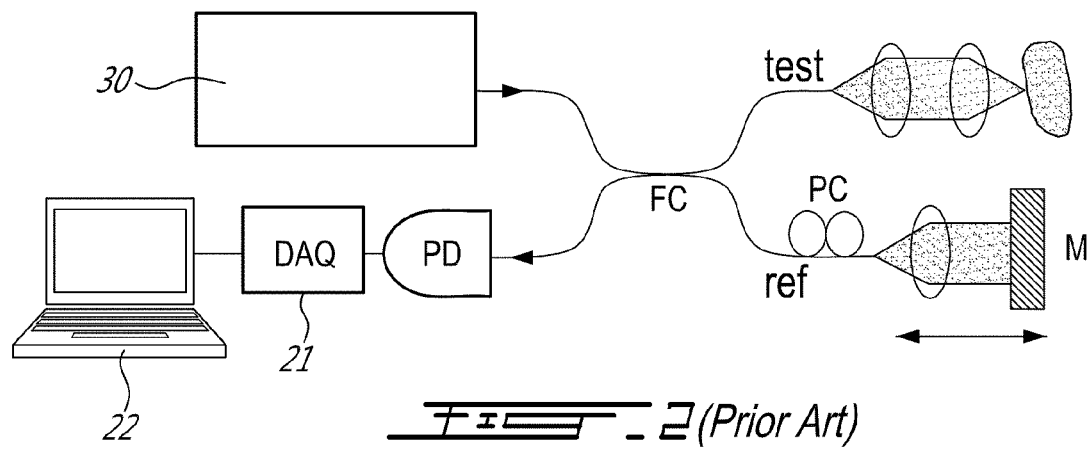
FIG. 2 is a schematic diagram illustrating a set up for optical low coherence reflectometry (OLCR), as known in the art.
Figure 3:
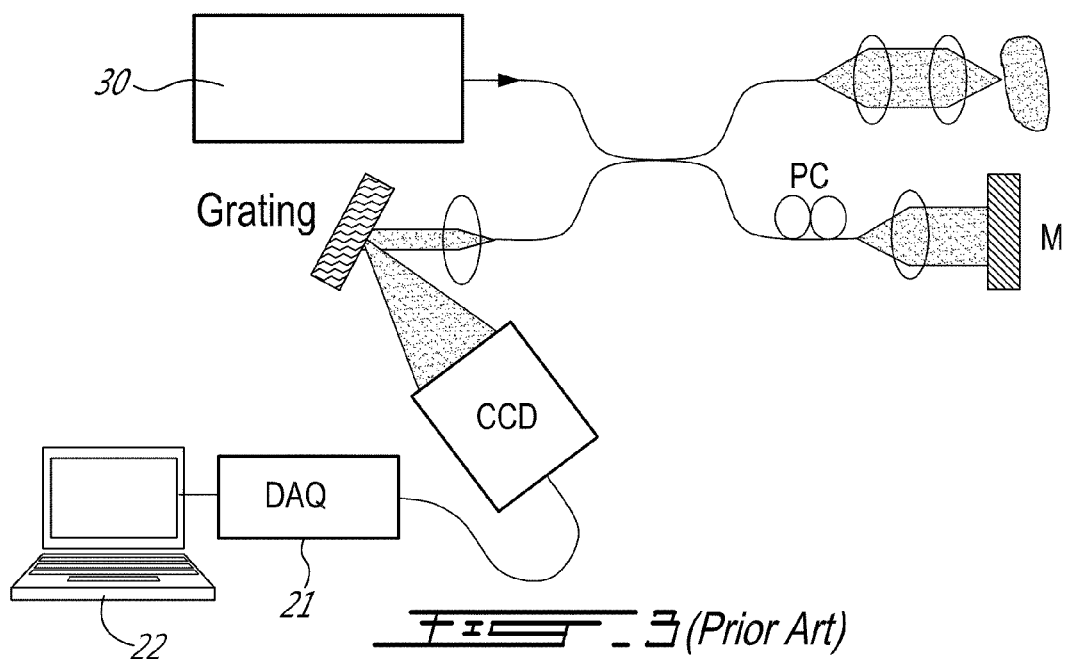
FIG. 3 is a schematic diagram illustrating a set up for optical frequency domain reflectometry (OFDR), as known in the art.
Figure 4:
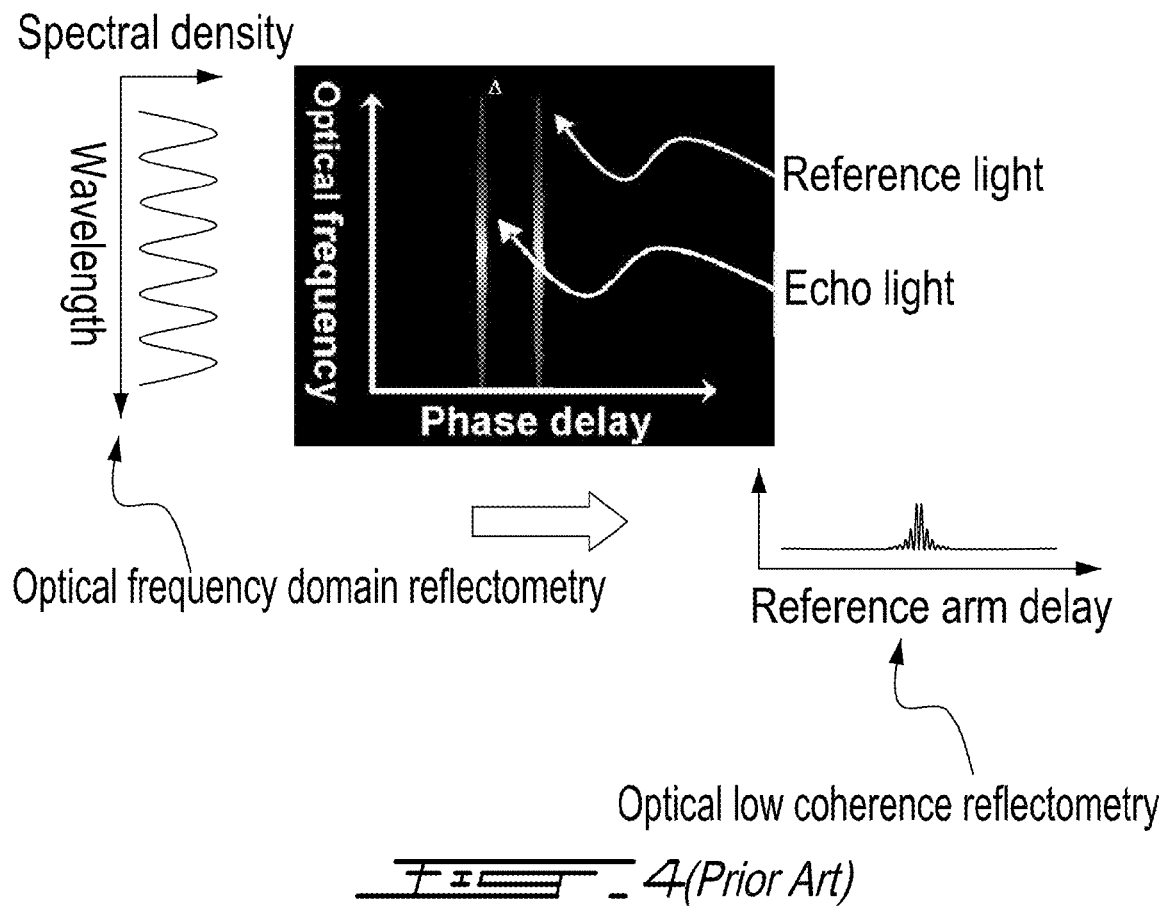
FIG. 4 is a schematic diagram illustrating the principle of operation of OLCR and OFDR showing the time-frequency representation of the combined lights at the output port of the interferometer, as known in the art.

Two examples illustrating the time-frequency distributions in the cross-chirp interference are shown in FIG. 6. The first example (upper figure) shows an interference between a dispersed light and a non-dispersed light which propagated through the interferometer arms with a dispersive and a non-dispersive medium, respectively. As can be seen, a single phase matching exists between the two lights. This phase matching indicates the zero time delay at the spectral component. The matched spectral component linearly varies depending on the time delay between the two interferometer arms given that the group delay dispersion is the dominant term in the net phase variation. The second example (lower figure) shows the interference of lights dispersed with opposite sign of dispersion (a corresponding system example is shown in FIG. 4). The phase matched spectral component can be detected as a pulsed profile by gating (filtering) the spectral interference with an optimized spectral resolution. An example of the gated spectrum measurement is shown on the left of FIG. 6.

Figure 7:
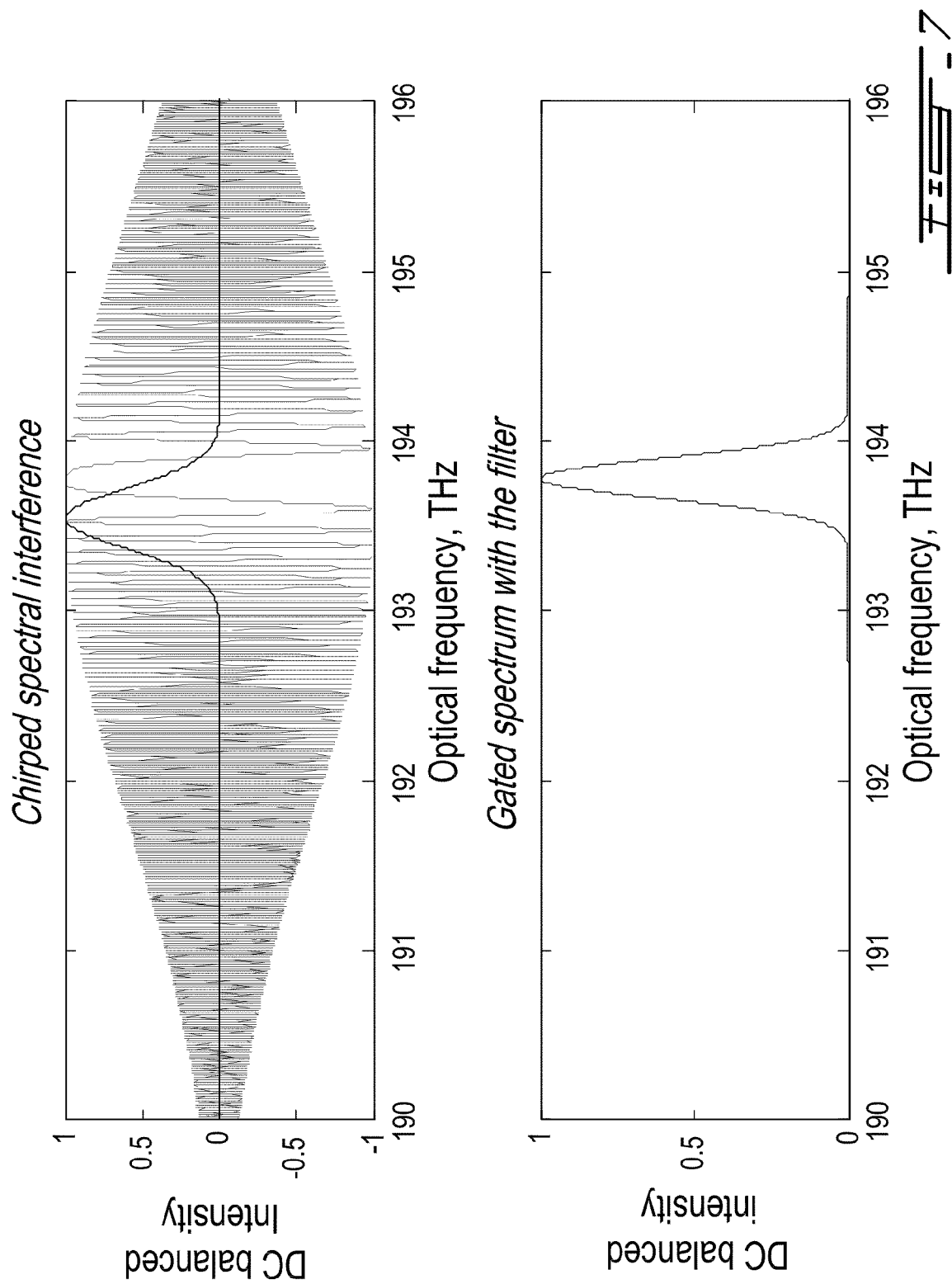
FIG. 7 shows a numerical example of a cross-chirp spectral interferogram and an optimum gated profile.

To illustrate the gating phenomena in more details, FIG. 7 shows (top graph) a theoretical spectral chirped (DC-balanced) interference with infinitively fine spectral resolution, and (bottom graph) a detail close to the real spectral interference in XCI with an optimum spectral resolution.

A numerical cross-chirp spectral interference profile is shown with a narrow (fine) spectral resolution on the top graph of FIG. 7. This fine resolution allows simulating the theoretical spectral interference patterns. The low-frequency spectral modulation exists at the phase matched spectral component. Note that, in this simulation, the background signal (i.e. the optical spectrum of the light source which has 20-nm Full-Width-at-Half-Maximum) was subtracted from the interference to display a 'balanced (AC-only)' interferogram. Practically, this can be implemented by either acquiring the spectrum at another photodetector or employing a balanced differential photo-receiver set-up. The spectral component can be filtered when the optimum spectral resolution in the interferometer detection system, which can be implemented using either a spectrometer or a wavelength tunable laser as described hereinbelow, is comparable with the period of the slowly-varying spectral interference (i.e. when the frequency bandwidth of the resolution is comparable to $\sqrt{2\pi/\ddot{\Phi}_0}$ where $\ddot{\Phi}_0$ is the group delay dispersion of the net dispersion imbalance). The bottom graph in FIG. 7 shows the same interference profile with a coarse spectral resolution. This numerical calculation was performed assuming a net dispersion of 4 ps/nm, a spectral FWHM (Full-Width-at-Half-maximum) bandwidth of 20 nm at 1550 nm, and a spectral resolution of 1.3 nm. Here, the spectrum coordinate can be replaced by the depth range (L) as the spectrum bandwidth ($\Delta\lambda$) is linearly proportional to the range, i.e. $c \cdot \Delta\lambda \cdot \ddot{\Phi}_\lambda/2 = L$, where $\ddot{\Phi}_\lambda = -2\pi c \ddot{\Phi}_0/\lambda_0^2$, c is the speed of light and $\lambda_0$ is the center wavelength of the light source. Here the gated spectral linewidth (which corresponds to the axial resolution for the light ranging) can be modified by the dispersion amount, i.e. it should be proportional to $\lambda/\sqrt{c\ddot{\Phi}_\lambda}$.

Thus, a large dispersion and a short wavelength improve the resolution of the system. The range is also associated with the dispersion amount, as already mentioned above. The maximum axial depth range may be determined by the proportional coefficient ($c \cdot \Delta\lambda \cdot \ddot{\Phi}_\lambda/2$) including the system spectral bandwidth and the dispersion. A practical range can be easily extendable from a centimeter to at least 10 meters by using a linearly chirped fiber Bragg grating (LCFG). A cascaded LCFG can multiple the ranges.

The resolution, defined as a minimum resolvable distance between two reflections along the line-of-sight in proximity, varies with the dispersion from sub-millimeter to a few centimeters. The accuracy indicates the error in position detection. Nominally, it should be achievable up to a value about 100 times smaller than the electric pulse width by using a conventional electronic sampler at high signal-to-noise ratio. Here, it is assumed that conventional pulse discrimination technique or other numerical techniques can be generally applicable for determining the range from the pulse envelope. Thus, those straightforward well-known methods are not described here.

Figure 8:
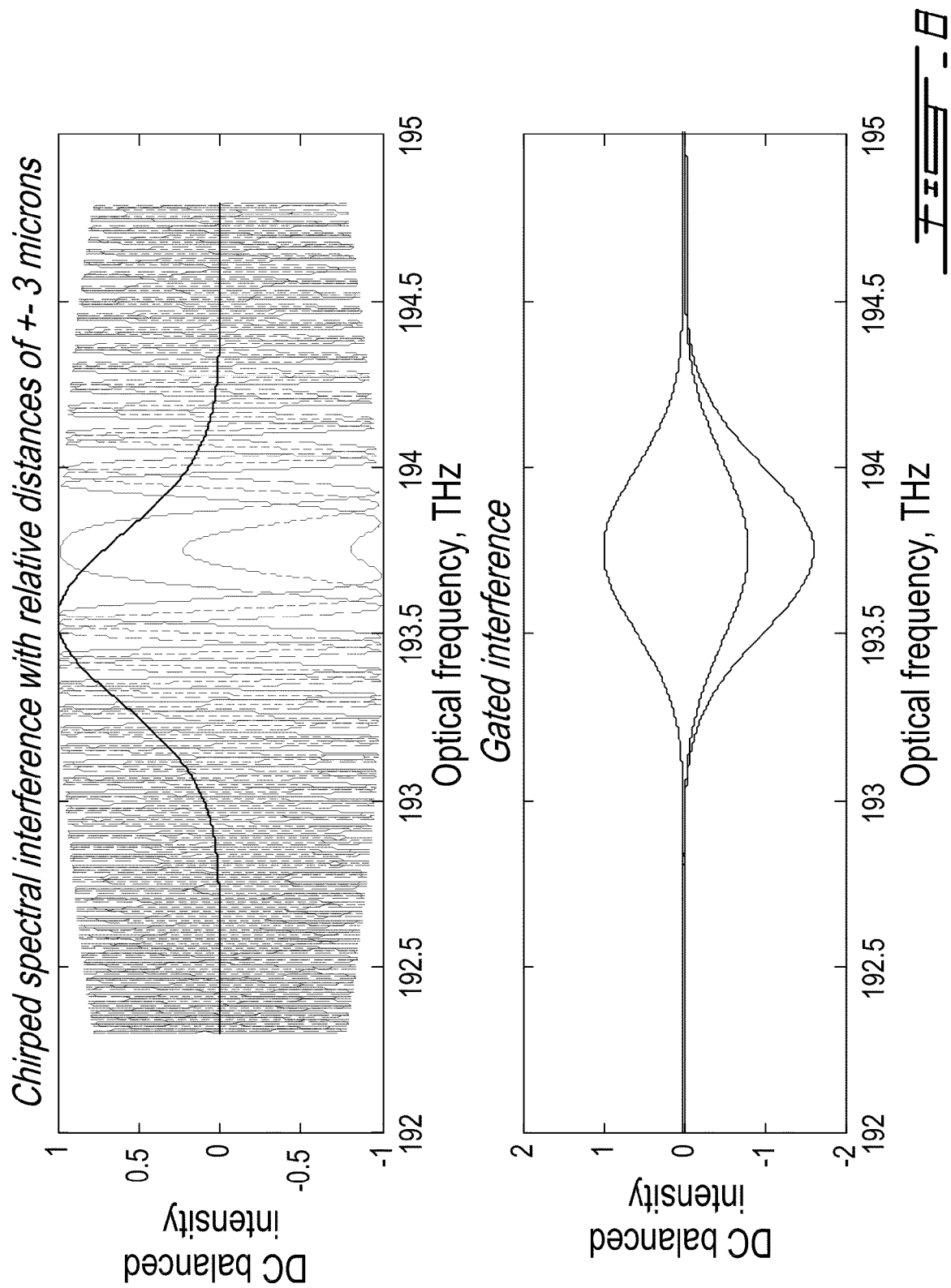
FIG. 8 shows some numerical examples of cross-chirp spectral interferences at different phase-matching conditions made by displacing the phase delay by +/−3 micrometers.

The gated pulse shape and amplitude can be varied depending on the phase-matching condition that may be modified by the phase delay. Examples of interferograms at different phase-matching conditions are shown in FIG. 8. In this example, each phase delay for the corresponding interferogram is displaced among others by 20 fs, which corresponds to the relative distance of approximately 3 micrometers. The gated pulse shapes have different pulse widths and relative amplitudes. An amplitude peak at a certain condition may be attenuated by more than 15 dB from the maximized peak by the different phase matching conditions.

Other multiplication techniques can be also applicable.

According to a second embodiment, there is provided a system for multiplying the detection range by the use of phase modulated multiple time-delays in the reference arm, as illustrated for example in FIG. 9.

The system illustrated in FIG. 9 is able to multiply the detection range by the use of phase modulated multiple time-delays in the reference arm. The source signal is divided between the signal arm (+D) and the reference arm (−D), and the reference arm (−D) is itself divided into a plurality of reference arms, each one having an optical delay varied by movement of a respective reference mirror (M). The source signal 30 is a wavelength swept laser, which generates a continuous wave with linear wavelength sweep in time. A fiber optic circulator 50 routes, on the one hand, the forward light wave to a fiber-optic 2×2 coupler 52 that is used to form the Michelson fiber-optic interferometer, and, on the other hand, the reflected (backward) light to the detector. Opposite signs of dispersion are applied to each interferometer arm to be able to induce the dispersion imbalance as in the case shown in FIG. 5. A polarization controller 52 adjusts the state of polarization of the outgoing and incoming signal lights for achieving a maximum interference contrast. Light in the signal arm is collimated through a coupling lens 54 and reflected back from an object (reflector) 56. Light in the reference arm is multiplexed using a fiber-optic multi-port coupler and modulated in phase or amplitude at different frequencies with which the references are tagged in order to identify them at the electronic detection using bandpass filters. At each reference arms, optical fibers with precalibrated lengths are added in each arm which is a successive multiple of the detection range (here the detection range is defined as the dispersion-bandwidth product): f, 2f, 3f etc. . . . . Thus, a signal light by single reflection interferes only with one of the references that are discretely deployed in the multiplied detection ranges and phase-modulated at different frequencies. Light from the references and the signal is interfered at a balanced photo receiver 32 when the wavelength of the laser light is swept. The pulse envelope signal is detected after filtering the interference through bandpass filters 60 with pre-assigned frequencies so that signals from the deployed detection ranges are demultiplexed and further processed in 62.

Thus, multiple pre-calibrated time-delays can be used for extending the coherent interaction, where the pre-calibrated lengths are the multiple of the grating length. Each time-delay reference needs to be modulated in phase or amplitude in order to identify which delay arm is interfered with the signal reflected from the object 56. The detected signal can be demultiplexed into the respective delays in electronic circuits by bandpass-filtering each modulated frequency.

Figure 12:
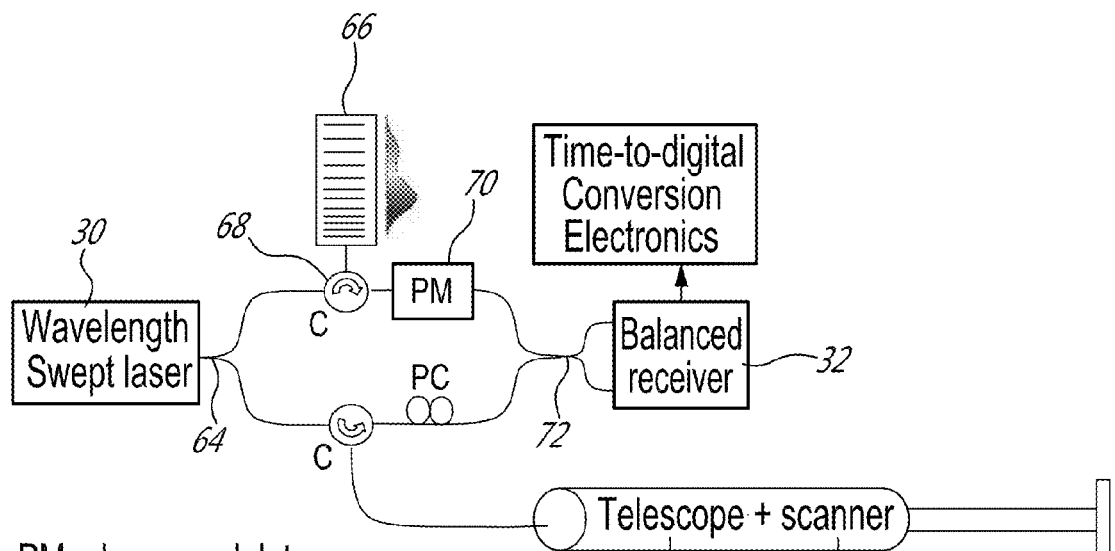
FIG. 12 is a schematic set-up for a practical implementation for laser range finder based on the XCI according to an embodiment of the present invention.

According to another embodiment, to avoid the unstable detection of the gated pulse, the phase of the reference arm light may be modulated periodically in a cross-chirped interference system comprising a wavelength swept laser as illustrated in FIG. 12, and an envelope detection technique may be used, which may be based on either a lock-in frequency demodulation or a signal rectification.

The phase modulation technique is a well known technique in OLCR to detect an envelope signal. Schematic of the lock-in frequency demodulation and the signal rectification is shown in FIG. 10, as known in the art [6]. The periodic phase modulation allows acquiring stable pulse envelope with an internal periodic modulation where the modulation frequency has to be at least 100 times higher than the wavelength sweep rate in order to induce a large number of modulation cycles in the internal modulation.

In the embodiment illustrated in FIG. 12, a 1×2 fiber coupler 64 splits the light from the wavelength swept laser 30 into two fiber arms. One is dispersed by a dispersive medium under the form of a linearly chirped fiber Bragg grating 66 working in reflection so that a fiber-optic circulator 68 has to be used to route the reflected light into a phase modulator 70. The dispersed light is phase-modulated at a fixed frequency to be able to induce a local oscillation and combined with the signal light through a 2×2 fiber coupler 72. The other light for signal is routed first to a telescope lens 74 and collimated. A scanner 76 may be used to scan the object in 2 dimensions. Reflected light from the object is routed to the 2×2 coupler and two interfered signals are generated and detected at a balanced differential photo-detector 32. Each detected signal has its modulation phase with a 180-degree shift relatively with each other. Thus, when one signal is subtracted to the other, the background signal (which is considered as common amplitude) can be eliminated and only coherent signals remain.

Figure 11:
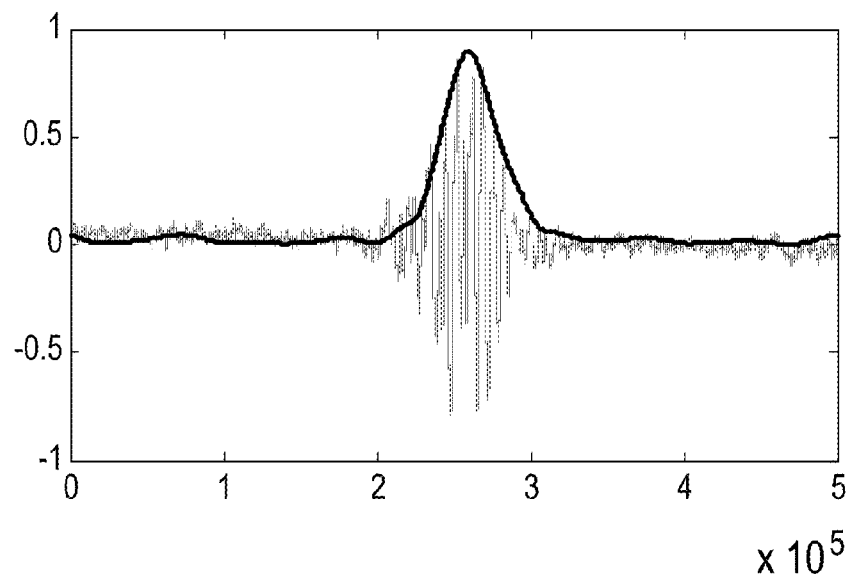
FIG. 11 shows an experimental example of a gated signal and its envelope detection.

An example of the detected signal is shown in FIG. 11, which consists of a pulse-like waveform with periodic internal modulation induced by the local oscillation. An envelope detection electronic device is used to extract the envelope information. A schematic of the electronic signal processing is shown in FIG. 10. The time delay of the signal (proportional to the distance to the object) is determined by the time delay detection of the envelope signal.

Figure 15:
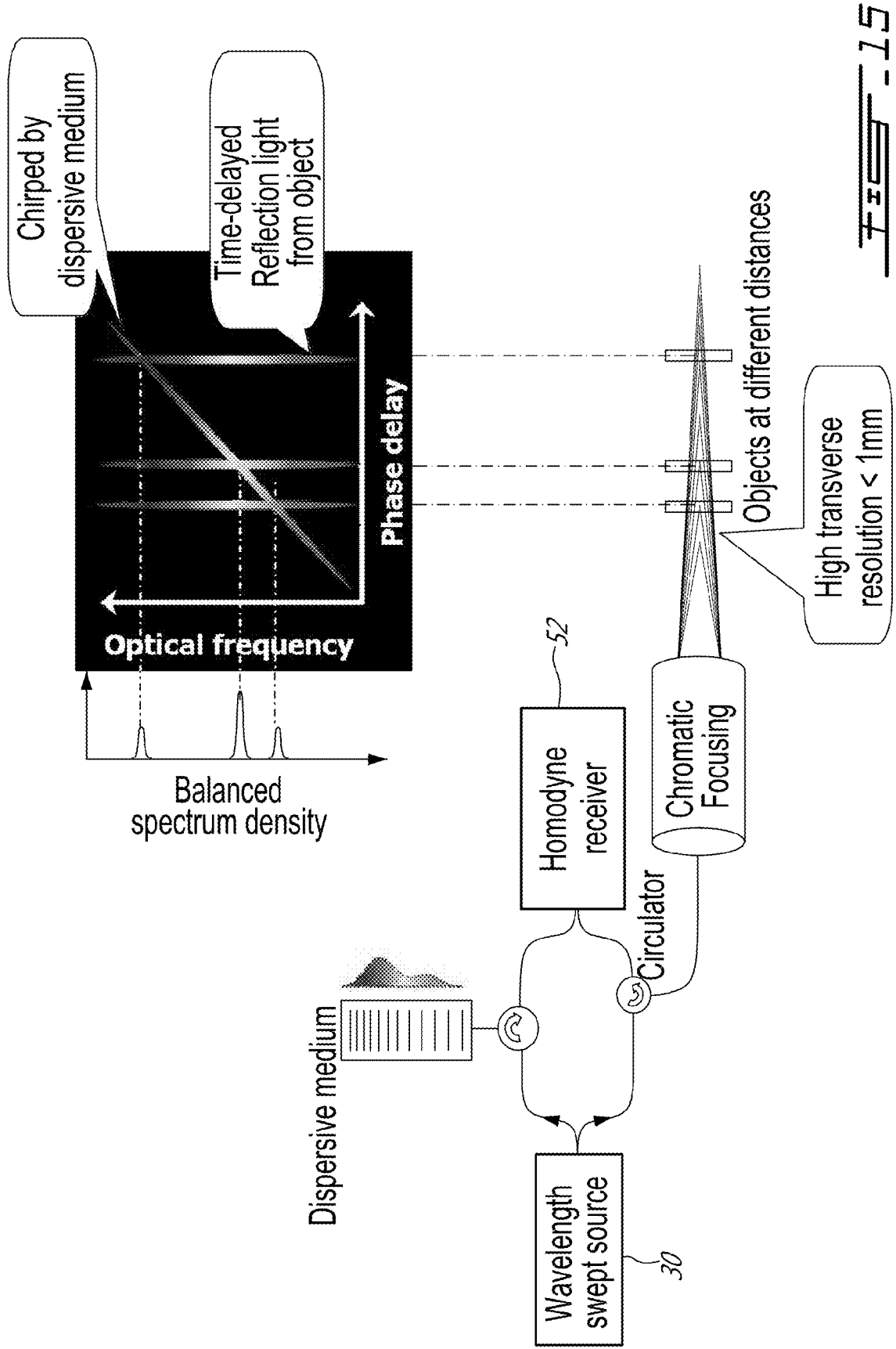
FIG. 15 is a schematic example illustrating a laser range finder based on the cross-chirp interference (XCI) according to a further embodiment of an aspect of the present invention.

In a further embodiment, the single balanced receiver 32 of the system illustrated in FIG. 12 can be replaced by a homodyne coherent receiver 52, as shown in FIG. 15 for example, in order to extract the envelope signal without the phase modulation [7-9].

Figure 13:
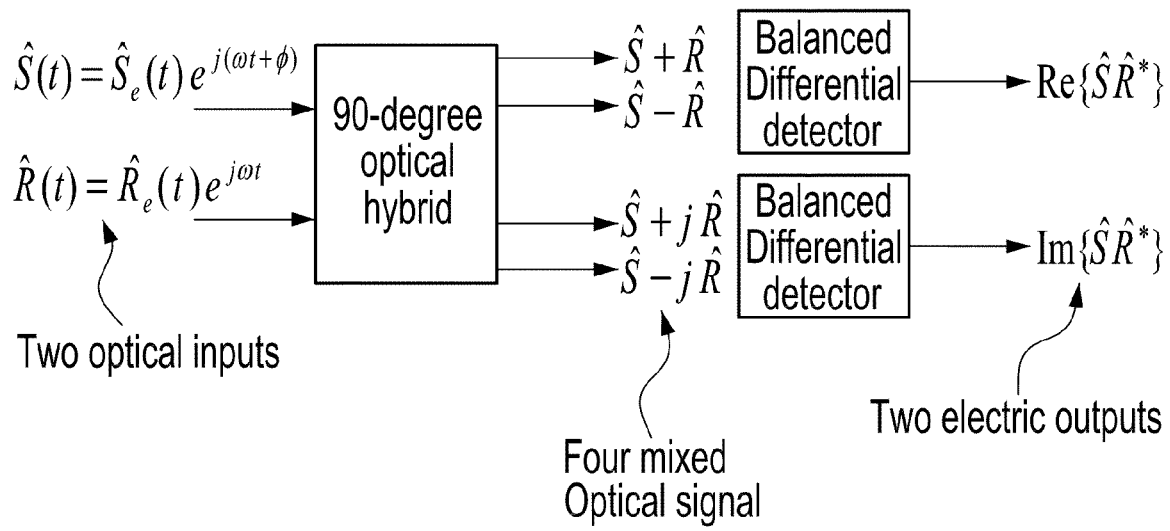
FIG. 13 illustrate the procedure for optical homodyne detection, as known in the art.

A schematic of the optical homodyne detection is shown in FIG. 13. The homodyne receiver 52 compiles the pair of spectral interference profiles with the phase difference of $\pi/2$. Consequently, when the light reflection from a reflector ($\hat{S}$) and the reference light ($\hat{R}$) are entered into the homodyne receiver, four mixed optical outputs ($\hat{S}+\hat{R}, \hat{S}-\hat{R}, \hat{S}+j\hat{R}, \hat{S}+j\hat{R}$) are generated at the output of the 90-degree optical hybrid as illustrated in FIG. 13. A pair of balanced detectors produces two electric signals comprising $\text{Re}\{\hat{S}\hat{R}^*\}$ and $\text{Im}\{\hat{S}\hat{R}^*\}$. In homodyne configurations, the sum of the squared signals corresponds to the gated pulse envelope such as shown in FIG. 7 (bottom graph).

Spectral filtering and detection can be implemented either using a spectrometer, a wavelength tunable filter, or a wavelength swept laser for example.

An example using a spectrometer is shown in FIG. 5. This is particularly appropriate for a cost-effective solution in Visible or near-IR wavelength as a low-cost Si-CCD based spectrometer is available at these wavelengths.

In IR wavelength range (>1 μm), a method using wavelength tuning with a narrow bandpass filter or a wavelength swept laser can be used. An example for practical implementation incorporating the wavelength swept laser is shown in FIG. 12. In this example, a single-ended or a balanced detected comprising InGaAs or Ge photodetectors is used in the Mach-Zehnder type interferometer, although other two-arm interferometers can also be used.

Figure 14:
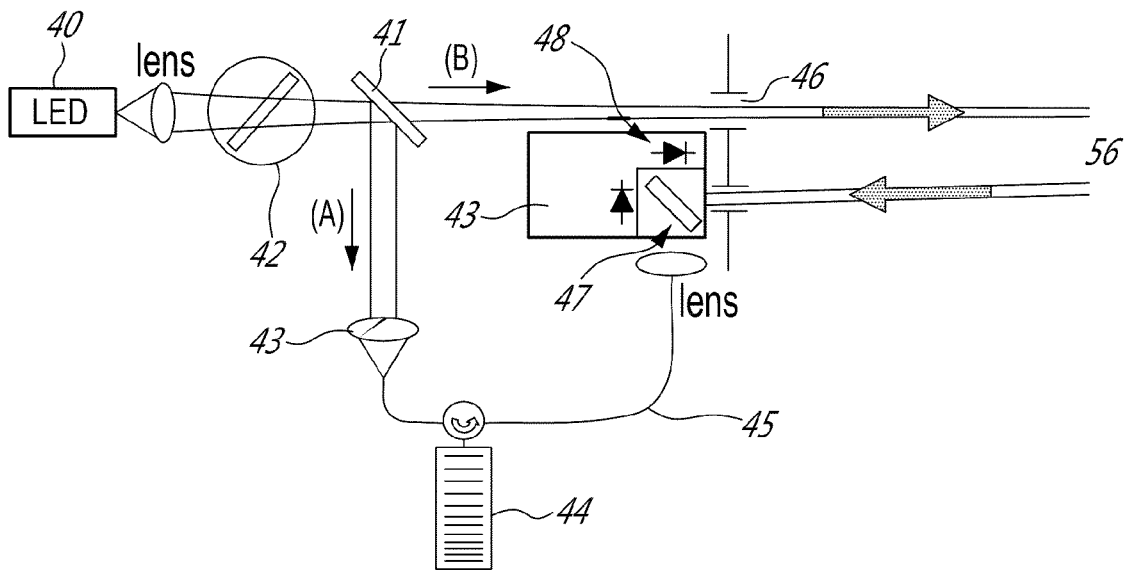
FIG. 14 illustrates an alternative setup, realizing the laser rangefinder based on the XCI using a light emitting diode (LED), according to an embodiment of the present invention.

As still a further embodiment, a system using a light emitting diode (LED) 40 is illustrated in FIG. 14. The spectrum is filtered by a fast-rotating Fabry-Perot filter 42 so that wavelengths with a finite linewidth are swept linearly in time. The light is split by a beam splitter 41 into two directions. One (Arrow A) is for the reference arm where the light is coupled into a single mode fiber 45 via a coupling lens 43 and dispersed by a LCFG 44. The coupling efficiency is expected to be poor. However, considering that the light reflected from objects needs only be between about $10^{-3}$ and $10^{-5}$ for achieving optimum interferences, the reference light can be very weak, i.e. lower than $10^{-3}$ of the filtered source power. The other (Arrow B) is directed to the object 56 and reflected back and partially entered through an aperture 46 and combined with the reference light in the balanced coherent beam detector 43, which comprises a beam splitter 47, two serially connected photo-detectors 48 and a transimpedance amplifier.

In still another embodiment, as a technical extension for improving transverse resolution of the cross-chirped interference laser rangefinder, chromatic focusing of the scanning beam [10] can be employed by taking advantage of the direct correspondence between the object distance and the sweeping wavelength discussed hereinabove in relation to FIG. 6. This allows effectively maintaining the spot-size of the light beam much narrower than that of a collimated beam, thus achieving a very high transversal resolution even over relatively long axial distances. A chromatic focusing system may be efficiently constructed with a series of diffractive lenses.

For a single diffractive lens, the wavelength dependent focal length can be determined by $f(\lambda)=f(\lambda_d)\lambda_d/\lambda$ at the zeroth order diffraction, where $f(\lambda_d)$ is the nominal focal length at the center (designed) wavelength $\lambda_d$ [10]. Thus, the focal length varies depending on how much the targeted wavelength is off from the center wavelength being in fact inversely proportional to the target wavelength. If the difference between the two wavelengths (i.e. for narrow wavelength tuning range) is much smaller than the center wavelength, the above expression can be approximated to find a linear proportion relation with respect to wavelength, as follows: $f(\lambda) \approx f(\lambda_d)[2-\lambda/\lambda_d]$ [10]. Thus, the focal length deviation around the normal focal length (i.e. $\Delta f = f(\lambda) - f(\lambda_d)$) is approximately given by $\Delta f \approx f(\lambda_d)[1-\lambda/\lambda_d]$. Because the deviation is directly proportional to the nominal focal length as well as to the wavelength tuning, one may need to design this system with a long nominal focal length in order to achieve a desired large deviation, i.e. to cover a relatively long depth range. For example, the target focal length could be deviated only by ~10% of the designed focal length $f(\lambda_d)$ with a 150 nm source bandwidth at the center wavelength of 1500 nm. For proper development, the chromatic focal range is to be matched to the XCI range: $\Delta f = c \cdot \Delta\lambda \cdot \ddot{\Phi}_\lambda/2$. Moreover, if a diffractive lens system is used, since it disperses negatively (i.e. the focal length at red shift is shorter than that at blue shift), the reference light has to be negatively dispersed relative to the signal light (light at red shift travels faster than that at blue shift.) as shown in FIG. 15.

The present light echoes-to-spectrum mapping method may further be applied for optical spectrum analysis. A linear scanning of the optical delay line in the interferometer reference arm induces a chirped spectral interferogram whose envelope is directly proportional to the spectral density of the input light source.

Figure 16:
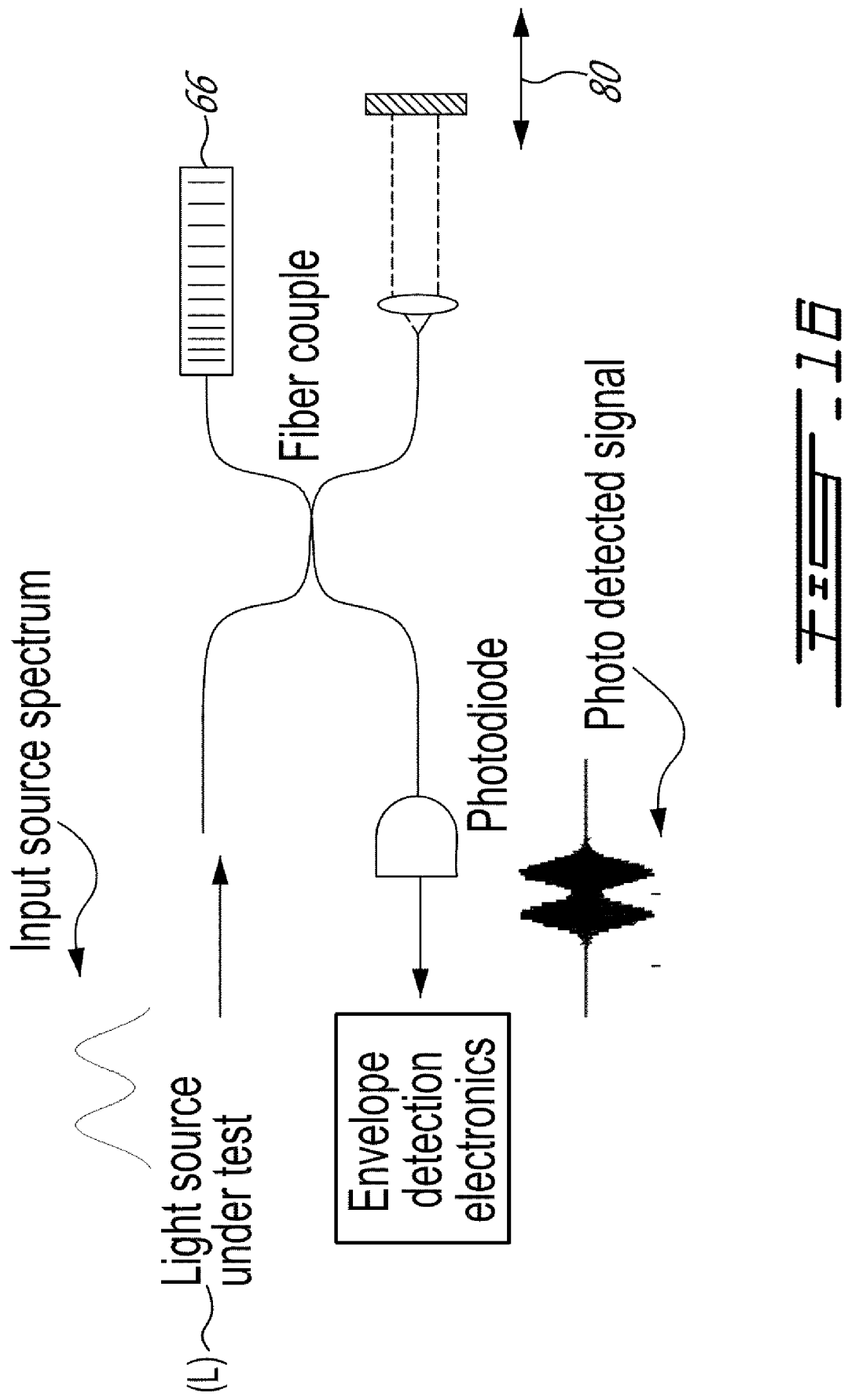
FIG. 16 is a schematic of a system diagram and principle illustrating a spectral analysis based on XCI.

A schematic of a measurement system for practical implementation using a linearly chirped fiber Bragg grating (LCFG) is shown in FIG. 16. The light source (L) of which spectrum is to be characterized enters into one of the input ports of the fiber-optic Michelson interferometer. Here, the dispersion imbalance induced by applying different dispersive medium is applied. As illustrated in FIG. 16, for example, a highly dispersive medium 66 such as a linearly chirped fiber Bragg grating is used in one of the interferometer arms and is operating in reflection. The other arm is prepared to be able to vary the relative optical path length between the two interferometer arms so that a variable optical delay line 80 is installed. The two copies of the light reflected from the two arms are combined and interfered, where the interfering spectrum that is determined by the phase matching condition illustrated in the first plot of FIG. 6 is proportional to the optical path length difference. Thus, the interference light power is recorded when the delay line is moving. An electronic envelope detection illustrated in FIG. 10 can be applied to extract the envelope waveform out of the interference pattern which is proportional to the spectrum of the light source.

When the net dispersion between the arms is mismatched, the convolution of the virtual pulses is broadened. This is equivalent to the convolution between a virtually dispersed pulse and a transform limited pulse where the dispersed pulse has been induced by the mismatched dispersion. Assuming that the mismatch is extremely large compared to the transform limited pulse width, it can be easily shown that the spectrum is mapped into the pulse envelope according to the optical Fourier transformation theory. Thus, the convolution of the two pulses should be proportional to the spectral density of the light source. Here is the theoretical description. Here, the 'virtual' pulse means that the pulse does not need to exist in reality but does in theory only by Fourier transformation of the given spectrum from any broadband source. It is important to note that in the conventional optical Fourier transformation the convolution partner should be a real input pulse. However, in this XCI, the input light source is not restricted to a pulsed light. It can be any time-featured source with a broad spectral bandwidth.

Suppose that the frequency dependent phase mismatch is written as $\Delta\Phi(\omega) = 2\beta_f \Delta L \Phi_{LCFG}$, where $\beta_f$ is the propagation constant of the optical fiber in interferometer arms, $\Delta L$ is the unbalanced length, $\Phi_{LCFG}$ is the frequency dependent phase of the dispersive device (i.e. the linearly chirped fiber Bragg grating in FIG. 16). The time-averaged AC current detected at the photo-receiver with respect to the time delay ($\tau$) is proportional to:

$$\langle i(\tau)\rangle_{ac} \propto \qquad (1)$$

$$\int_{-\infty}^{\infty} S(\omega-\omega_c)\exp[-j\Delta\Phi(\omega-\omega_c)]\exp[-j\tau(\omega-\omega_c)]d(\omega-\omega_c) \propto$$

$$\int_{-\infty}^{\infty} S(\omega-\omega_c)\exp[-\beta_f''(\omega-\omega_c)^2\Delta L]$$

$$\exp[-j\Phi_{LCFG}]\exp[-j(\tau_g+\tau)(\omega-\omega_c)]d(\omega-\omega_c)$$

where $S(\omega-\omega_c) \equiv |E_r| \cdot |E_s|$ i.e. the amplitude product of the lights reflected from the grating and from the delay line, $\tau_g$ is the group delay of the optical fiber. The complex conjugate of the interference AC terms is not shown in Eq. 1 for convenience. Here, the fiber dispersion, $\beta_f''$ is much smaller than that of the LCFG ($\beta_f'' \cdot \Delta L \ll \ddot{\Phi}_{LCFG}$). Thus, its influence is negligible. This signal with respect to the time delay turns out to be a convolution of the virtual autocorrelation ($\mathfrak{F}^{-1}\{S(\omega-\omega_c)\}$) and the impulse response of the LCFG $$\left(\exp\left[j\frac{1}{2\ddot{\Phi}_{LCFG}}\tau_R^2\right]\right)$$

as the following derivation:

$$\langle i(\tau')\rangle_{ac} \propto \int_{-\infty}^{\infty} S(\omega-\omega_c)\exp[-j\Phi_{LCFG}]\exp[-j\tau'(\omega-\omega_c)]d(\omega-\omega_c) \propto$$

$$\mathfrak{F}^{-1}\{S(\omega-\omega_c)\exp[-j\Phi_{LCFG}]\} \propto \mathfrak{F}^{-1}\{S(\omega-\omega_c)\} \otimes \exp\left[j\frac{1}{2\ddot{\Phi}_{LCFG}}\tau'^2\right]$$

It is well known that the convolution with the LCFG impulse response is actually the optical Fourier transformation if the group delay dispersion is sufficiently larger than the convolution partner (i.e. the virtual autocorrelation). Consequently, this optical Fourier transformation in the XCI cancels out the original inverse Fourier transform resulting in the direct mapping of the optical spectrum into the time-averaged interference envelope detection with respect to the scanning optical delay as the following:

$$\langle i(\tau')\rangle \propto \mathfrak{F}^{-1}\{S(\omega-\omega_c)\} \otimes \exp\left[j\frac{1}{2\ddot{\Phi}_{LCFG}}\tau'^2\right] \propto$$

$$\exp\left[j\frac{1}{2\ddot{\Phi}_{LCFG}}\tau'^2\right]\int_{-\infty}^{\infty}\mathfrak{F}^{-1}\{S(\omega-\omega_c)\}\exp[-j\Delta\tau \cdot \tau']d\Delta\tau \propto$$

$$\exp\left[j\frac{1}{2\ddot{\Phi}_{LCFG}}\tau'^2\right]\mathfrak{F}\{\mathfrak{F}^{-1}\{S(\omega-\omega_c)\}\} \propto \exp\left[j\frac{1}{2\ddot{\Phi}_{LCFG}}\tau'^2\right] \cdot S(\tau')$$

From the foregoing, it should be now apparent that there is provided a system for mapping light echoes into a light spectrum, generally comprising a generation/detection unit; a dispersive medium; and a receiver.

In a further aspect of the present invention, there is provided a free space GPS-like position identification system and a method for determining the local position of the receiver by detecting two relative distances from two phase-modulated transmitters. The transmitters are identified by their different phase modulation frequencies. At least two phase modulated lights and a reference light are required for uniquely determining the 2D local position, as shown in FIG. 17.

The system illustrated in FIG. 17 is designed to identify the local position of the receiver relative to the locations of the transmitters. The receiver detects the relative distances between the reference light and the phase-modulated lights.

A wavelength swept light source as a broadband light 30 is used for the same purpose as in the systems illustrated in FIGS. 12 and 15. Wavelength of the light emitted from the laser is swept in time linearly to provide spectral measurement in the time domain using a single-ended or a balanced photo-detection system 32. A fiber-optic Mach-Zehnder interferometer is used. With the same purpose as for the unbalanced dispersion in the system illustrated in FIG. 12, a linearly chirped fiber Bragg grating 66 with a large dispersion is applied and used in the upper interferometer arm. The dispersed light induced by the grating 66 is delivered by an optical fiber and emitted to the local space through a lens system 100 with a diverging angle and is to be interfered with the light emitted from the bottom arm. The other copy of the light source is directed to a phase modulator 102 and modulated at a fixed frequency that will be used for identifying and isolating one of multiplied references. To be able to multiply the references, the copied light is split into a number of fiber-optic paths 104 by use of a multi-arm fiber coupler, the subsequently phase-modulated at different frequencies, and emitted to the space. The interfered light among the dispersed light and multiple references is localized in the region overlapping the two diverging light waves as shown, and detected at a balanced photo receiver 106. The distances from emitting points are labeled 'L1' for the distance from the dispersed light and 'L2' from the phase modulated reference light, respectively. An electric bandpass filter system 108 is used to be able to filter out the other frequencies that are associated with the modulated light from other references. The relative distance between L1 and L2 is mapped into the wavelength sweep because of the phase matching condition illustrated in this FIG. 17 and described also in FIGS. 6 (top plot) and 15. Assuming that the distance between the reference and the dispersed light is known, L1 and the L2 can thus be determined.

Although the present invention has been described hereinabove by way of specific embodiments thereof, it can be modified, without departing from the nature and teachings of the subject invention as described hereinabove.

REFERENCES (1) Signal seeking pulse radar altimeter and distance measuring system, U.S. Pat. No. 3,305,862
(2) Distance measuring apparatus based on the pulse travel time method, U.S. Pat. No. 4,344,705
(3) B. J. Soller, D. K. Gifford, M. S. Wolfe, M. E. Frogatt, Optic Express 666, Vol. 13, N. 2, 2005.
(4) R. Huber, M. Wojtkowski, K. Taira, J. C. Fujimoto, Optic Express 3513, Vol. 13, N. 9, 2005.
(5) Request for proposal, "Technologies for detecting vehicle position within a certain range with high precision" Nine Sigma Inc. Request#11057-1 Sep. 2008
(6) M. R. Hee, "Optical coherence tomography: theory" in *Handbook of optical coherence tomography*, edited by B. Bouma and G. Tearney, pp. 50-66 Marcel Dekker Inc. (2002)
(7) Homodyne based optical coherence microscope, US20060061769
(8) Homodyne optical receiver, U.S. Pat. No. 5,323,258
(9) Optical homodyne receiver, U.S. Pat. No. 5,007,106
(10) S. Dobson et al, "Diffractive lenses for chromatic confocal imaging," Appl. Opt. Vol. 36, no. 20, pp 4744-4748 1997

The invention claimed is:

1. An interferometric system, comprising:
a broadband source;
an interferometer between said broadband source and an object; and
a detector circuit;
wherein a signal from said source is divided into a signal arm and a reference arm of said interferometer, light in the signal arm being reflected back from the object, light in the reference arm being modulated in one of: i) phase and ii) amplitude, and signals from the two arms are cross-chirped by unbalanced dispersions and combined, said detector circuit detecting a time-delay of a single electric pulse in a resulting signal, the cross-chirp interference inducing a direct mapping of the time of flight into the spectrum with respect to a reference delay.

2. The system of claim 1, wherein said broadband source is one of: i) a continuous wave source and ii) a pulsed wave source.

3. The system of claim 1, wherein said signals in the two arms are dispersed with one of: i) different signs and ii) different amounts.

4. The system of claim 1, wherein said detector circuit comprises a balanced differential photo-receiver.

5. The system of claim 1, wherein the difference of the dispersion-bandwidth product in between the two interferometric arms determines a detectable position range.

6. The system of claim 1, wherein said system has a ranging capability for multiple targets separated by distances shorter than about 25 mm.

7. The system of claim 1, wherein said system has a sensitive range detection of at least about 40 m from a low frequency receiver with a precision of less than about 100 μm and a repetition rate of at least 100 Hz, in a 1.5 um wavelength range.

8. The system of claim 1, wherein said detector circuit has a bandwidth less than 10 MHz.

9. The system of claim 1, wherein said system has a detection dynamic range of up to about −100 dB.

10. The system of claim 1, wherein said system has a maximum axial depth range determined by $(c \cdot \Delta\lambda \cdot \ddot{\Phi}_\lambda/2)$, where c is the speed of light, $\Delta\lambda$ is the spectrum bandwidth, and $\ddot{\Phi}_0$ is the group delay dispersion of the net dispersion imbalance.

11. The system of claim 1, wherein said interferometer comprises at least one chirped fiber Bragg grating.

12. The system of claim 1, wherein said system has a resolution ranging from about sub-millimeter to a few centimeters.

13. The system of claim 1, wherein said interferometer comprises phase modulated multiple time-delays in the reference arm.

14. The system of claim 1, wherein said source is a wavelength swept laser, said reference arm is divided into a plurality of reference arms, each one of the plurality of reference arms being provided with optical fibers with precalibrated lengths of a successive multiple of the detection range of the system, signals from the reference arms and the signal arm being interfered at a balanced photo receiver when the wavelength of the laser light is swept, and a pulse envelope signal being detected after filtering the interference through bandpass filters with pre-assigned frequencies.

15. The system of claim 1, wherein said source is a wavelength swept laser.

16. The system of claim 1, wherein said source is a wavelength swept laser and said detector circuit comprises a balanced differential receiver, said reference arm comprises a dispersive medium and a phase modulator, the light on the signal arm being routed first to a telescope lens and collimated, said balanced differential receiver detecting two generated interfered signals, each signal being phase modulated with a relative phase shift of 180 degrees.

17. The system of claim 1, wherein said source is a wavelength swept source and said detector circuit comprises a homodyne coherent receiver, said reference arm comprises a dispersive medium, the light on the signal arm being routed first to a chromatic focusing device, said homodyne receiver receiving two generated interfered signals.

18. The system of claim 1, wherein said system comprises one of: a spectrometer, a wavelength tunable filter, and a wavelength swept laser.

19. The system of claim 1, wherein said detector circuit comprises a spectrometer.

20. The system of claim 1, wherein said broadband source is a LED, the spectrum of said source is filtered so that wavelengths with a finite linewidth are swept linearly in time.

21. The system of claim 20, wherein the spectrum is filtered by a fast-rotating Fabry-Perot filter, the light is then split by a beam splitter into the two arms, the reference arm comprising a linearly chirped fiber Bragg grating, the light in the signal arm being directed to the object, reflected back and partially combined with the reference light in a balanced coherent beam detector of the detector circuit.

22. The system of claim 1, further comprising a chromatic focusing unit.

23. The system of claim 22, wherein said chromatic focusing unit comprises a series of diffractive lenses.

24. The system of claim 22, wherein said chromatic focusing unit comprises a series of diffractive lenses, and said reference arm is negatively dispersed relative to the signal arm.

25. The system of claim 22, wherein the chromatic focal range is matched to the system range $\Delta f = c \cdot \Delta\lambda \cdot \ddot{\Phi}_\lambda / 2$.

26. The system of claim 1, wherein a dispersion imbalance is induced by applying different dispersive medium in the arms, and a variable optical delay is installed in one of the arms, the detector circuit comprising an envelope detector to extract an envelope waveform out of the interference pattern, the envelope waveform being proportional to the spectrum of the source.

27. The system of claim 26, providing a direct mapping of the optical spectrum into the time-averaged interference envelope detection with respect to the scanning optical delay as the following:

$$\langle i(\tau')\rangle \propto \mathcal{F}^{-1}\{S(\omega-\omega_c)\} \otimes \exp\left[j\frac{1}{2\ddot{\Phi}_{LCFG}}\tau'^2\right] \propto$$
$$\exp\left[j\frac{1}{2\ddot{\Phi}_{LCFG}}\tau'^2\right]\int_{-\infty}^{\infty}\mathcal{F}^{-1}\{S(\omega-\omega_c)\}\exp[-j\Delta\tau\cdot\tau']d\Delta\tau \propto$$
$$\exp\left[j\frac{1}{2\ddot{\Phi}_{LCFG}}\tau'^2\right]\mathcal{F}\{\mathcal{F}^{-1}\{S(\omega-\omega_c)\}\} \propto \exp\left[j\frac{1}{2\ddot{\Phi}_{LCFG}}\tau'^2\right]\cdot S(\tau').$$

28. The system of claim 1, wherein said source is a time-featured source with a broad spectral bandwidth.

29. The system of claim 1, wherein said source is a wavelength swept light source, the light emitted from said source being swept linearly in time, said detector circuit comprises one of: i) a single-ended photodetector and ii) a balanced photodetector, said photodetector providing spectral measurement in the time domain, said interferometer being a fiber-optic Mach-Zehnder interferometer, said signal arm comprising a linearly chirped fiber Bragg grating with a large dispersion, the dispersed light from said grating being emitted to the local space to be interfered with the light emitted from the reference arm; the reference arm comprising a phase modulator and being split into a number of reference arms, then subsequently phase-modulated at different frequencies, and emitted to the local space to be interfered with the light emitted from the signal arm, the detector circuit detecting interfered lights among the dispersed signal light and multiple reference lights, the detecting circuit further comprising a bandpass filter system able to filter out frequencies that are associated with the modulated light from selected references.

30. The system of claim 1, said system being one of: i) a laser range finder system, ii) a spectral analysis system, and iii) a position identification system.

31. A method for light echoes-to-spectrum mapping, comprising:
    directing a signal reference from a broadband source to an object for reflection by the objet;
    modulating a reference signal from the broadband source in one of: i) phase and ii) amplitude;
    applying a dispersion-unbalanced interference between the two signals; and
    gating a resulting phase matched spectral component;
    wherein the interference induces a direct mapping of the source spectrum into an interference amplitude with respect to a reference delay.

* * * * *